US012806607B2

(12) United States Patent
Katz et al.

(10) Patent No.: US 12,806,607 B2
(45) Date of Patent: Nov. 24, 2026

(54) ONE-POT SYNTHESIS FOR DELAMINATED ZEOLITES

(71) Applicants: Chevron U.S.A. Inc., San Ramon, CA (US); The Regents of the University of California, Oakland, CA (US)

(72) Inventors: Alexander Katz, Richmond, CA (US); Abraham Martinez, Berkeley, CA (US); Le Xu, Berkeley, CA (US); Stacey I. Zones, San Francisco, CA (US)

(73) Assignees: Chevron U.S.A. Inc., San Ramon, CA (US); The Regents of the University of California, Oakland, CA (US)

( * ) Notice: Subject to any disclaimer, the term of this patent is extended or adjusted under 35 U.S.C. 154(b) by 730 days.

(21) Appl. No.: 18/322,244

(22) Filed: May 23, 2023

(65) Prior Publication Data

US 2023/0372912 A1 Nov. 23, 2023

Related U.S. Application Data

(60) Provisional application No. 63/344,806, filed on May 23, 2022.

(51) Int. Cl.

| | |
|---|---|
| ***B01J 29/70*** | (2006.01) |
| ***B01J 35/61*** | (2024.01) |
| ***B01J 35/63*** | (2024.01) |
| ***B01J 37/04*** | (2006.01) |
| ***B01J 37/08*** | (2006.01) |
| ***C01B 39/02*** | (2006.01) |
| ***C01B 39/04*** | (2006.01) |

(52) U.S. Cl.
CPC ............ *B01J 29/70* (2013.01); *B01J 35/615* (2024.01); *B01J 35/633* (2024.01); *B01J 37/04* (2013.01); *B01J 37/08* (2013.01)

(58) Field of Classification Search
CPC ........ B01J 29/70; B01J 35/615; B01J 35/633; B01J 37/04; B01J 37/08
See application file for complete search history.

(56) References Cited

U.S. PATENT DOCUMENTS

| | | | | |
|---|---|---|---|---|
| 4,510,256 | A | 4/1985 | Zones | |
| 8,562,042 | B2 | 10/2013 | Gonin et al. | |
| 9,126,190 | B2 * | 9/2015 | Zones | C01B 37/02 |
| 9,815,704 | B2 | 11/2017 | Xie | |
| 2015/0078990 | A1 | 3/2015 | Elomari | |
| 2016/0115396 | A1 | 4/2016 | Zhan et al. | |

OTHER PUBLICATIONS

Ramamurthy et al., Microporous and Mesoporous Materials, (2021), v.319, p. 111042(1-9).*

International Search Report and Written Opinion mailed Aug. 22, 2023 in PCT/US2023/023278.

Ramamurthy et al., "Substitution of Cetyltrimethylammonium for OSDA Cations during B-SSZ-70 Zeotype Synthesis and Its Influence on Delamination.", Microporous and Mesoporous Materials, v. 319, p. 111042, Mar. 18, 2021 https://doi.org/10.1016/j.micromeso.2021.111042.

Extended European Search Report and Written Opinion issued in corresponding European Patent Application No. 23812477.0, May 11, 2026.

Lew Christopher M. et al: "Synthesis, Physicochemical Characterization, and Catalytic Evaluation of Fe 3+—Containing SSZ-70 Zeolite", ACS Catalysis, vol. 12, No. 11, May 16, 2022, pp. 6464-6477.

* cited by examiner

*Primary Examiner* — Yong L Chu
(74) *Attorney, Agent, or Firm* — Erich Joseph Gess; Melissa M. Hayworth

(57) ABSTRACT

Provided is a method of preparing a delaminated Al-SSZ-70 zeolite. The method combines direct hydrothermal synthesis with $CTA^+$ cations and an imidazolium OSDA. A post-synthetic high shear mixing treatment is also preferred. In one embodiment, an Al-SSZ-70 zeolite seed is used, preferably with a Si/Al ratio of at least 50.

18 Claims, 13 Drawing Sheets

ONE-POT SYNTHESIS FOR DELAMINATED ZEOLITES

CROSS REFERENCE TO RELATED APPLICATIONS

This application claims priority to U.S. Provisional No. 63/344,806 filed May 23, 2022, entitled "One-Pot Synthesis for Delaminated Zeolites", the contents of which are hereby incorporated by reference in their entirety. This invention was made with U.S. government support under US Dept of Energy DE-FG02-05ER15696. The government has certain rights in the invention.

FIELD

This disclosure relates to the synthesis of delaminated, layered zeolite materials useful in reactions involving sterically bulky reactants. The synthesis is a direct one-pot synthesis.

BACKGROUND

Zeolites are microporous materials composed of aluminosilicate $TO_4$ tetrahedra, with a unique crystalline structure consisting of molecular channels and cavities. Although zeolites have been applied in many fields such as catalysis, gas separations, and adsorption due to their unique three-dimensional confinement as controlled by microporosity, their applications are mainly limited to those involving molecules that are small enough so as to freely access these internal voids. Sterically bulky molecules are often subject to severe diffusional constraints, because their large molecular size prevents them from entering the microporous channels of zeolites.

Therefore, in order to expand the repertoire of zeolites to include sterically bulky molecules, various approaches have been developed to introduce hierarchical porosity to conventional microporous zeolites, including soft/hard templating, demetallization, etc.

In particular, the synthesis of hierarchical zeolites by delamination of two-dimensional (2D) layered zeolitic precursors has attracted great attention. Part of this effort has been motivated by recent demonstrations of partial confinement on the external surface pockets of 2D MWW-type zeolitic layers, which accelerates catalytic reactions in both gas and liquid phases. The synthesis of 2D MWW-type zeolitic layers via post-synthetic delamination of a layered zeolite precursor has been pioneered by Corma and coworkers in 1998, with the synthesis of ITQ-2 zeolite, possessing an external surface area of about 700 $m^2/g$. However, due to the high pH and elevated temperature of the post-treatment conditions involved in delamination, an undesired consequence can be silica dissolution and zeolite amorphization. For this reason, there has been a concerted effort in subsequent work on increasing the mildness of delamination conditions, in order to preserve structural intra-layer integrity of delaminated zeolites and avoid the decrease in Si/Al ratio associated with framework silica dissolution. In this regard, the synthesis of UCB-3 zeolite with delaminated MWW layers under mild conditions was reported, but it required the use of corrosive halide reagents that include fluoride, as well as sonication, which was also required in all previously reported variants of delaminated zeolites. Difficulties in scale up were encountered.

However, in contrast to post-treatment approaches, it is more desirable, but highly challenging to directly, synthesize the delaminated MWW zeolite through hydrothermal synthesis. Although recent studies have shown that both MIT-1 and DS-ITQ-2 zeolites consist of delaminated MWW layers that can be prepared during direct hydrothermal synthesis processes, the requirement of using diquat-organic structure-directing agents (OSDAs) can be limiting from a practical standpoint. DS-ITQ-2 is reported to consist of 70% of single and double MWW layers, and has a surface area of about 300 $m^2/g$—less than half of that reported for ITQ-2. Recently, Rimer and coworkers demonstrated that the combination of OSDA comprising hexamethyleneimine (HMI) and the simple surfactant cetyltrimethylammonium bromide (CTAB) in direct synthesis results in a delaminated MCM-22 zeolite. However, in order to avoid synthesis of an amorphous phase when using this approach, a narrow window of Si/Al ratio is required, which is restricted to a range of low Si/Al values—a range that is less desirable for catalysis. In addition, crucial PXRD data at low angles of around 5 degrees 2θ and below are missing from the reports. Such data are required in order to assess the presence of a reticular, mesoporous, amorphous silica phase. The possible presence of such a phase remains an important foundational question because, at its essence, the synthesis of a delaminated zeolite requires retention of two dimensional order within a zeolitic nanosheet, as well as the breakage of three dimensional order between nanosheets, so as to isolate the nanosheets in an arrangement reminiscent of a house of cards. The ongoing nature of this challenge is summarized by the quintessential question: what are the selective synthetic approaches for preserving order within the nanosheet, while breaking bonds between nanosheets, all while avoiding the presence of an amorphous phase. The lack of triviality of this question is further raised by the approach needing to be ecofriendly (no halide reagents), scalable (no sonication), as well as practical from a cost perspective (no expensive surfactant synthesis).

Thus, while there has been notable progress in synthesizing near single-sheet MWW materials, the existing synthetic experiments highlight the difficulty of synthesizing a hierarchical MWW zeolite with a highly delaminated architecture given the constrains above, particularly while minimizing the presence of an amorphous phase. It would be highly desirable to extend the synthesis of a single-sheet MWW material to a broader span of Si/Al compositions, especially a relatively high framework Si/Al ratio, as needed in catalysis.

SUMMARY

Provided is a method combining direct hydrothermal synthesis with $CTA^+$ (cetyltrimethyl ammonium) cations and an OSDA, and in one embodiment, a post-synthetic high-shear mixing treatment. The method synthesizes highly delaminated Al-SSZ-70 zeolite. The zeolite can exhibit high external surface areas of at least 340 $m^2/g$, for example, 347 $m^2/g$. The presence of dual organic additives in the hydrothermal synthesis is believed to effectively restrain the MWW layer stacking by capping the external surface of the MWW layer with surfactant. This unique synthetic method synthesizes high-silica delaminated MWW zeolite, with little or no amorphous phase, which has not been previously achieved by a direct synthesis using a simple surfactant based on $CTA^+$ cations. In one embodiment, the mole % of $CTA^+$ ranges from 10 mol % to 60 mol % based on the total organic components (OSDA+$CTA^+$). In one embodiment, the Al-SSZ-70 zeolite has a Si/Al ratio of at least 50.

Among other factors, provided is a novel synthetic approach that leads to a high-silica delaminated MWW-type zeolite Al-SSZ-70. Benefits are also realized from post-synthetic high-shear mixing of the layered zeolite precursor to affect further delamination. The resulting delaminated zeolites show similar Brønsted/Lewis acid site distribution (as characterized by FTIR spectroscopy of adsorbed pyridine at various temperatures) and enhanced acid catalytic properties over a non-delaminated zeolite.

DETAILED DESCRIPTION

Figure 1A:
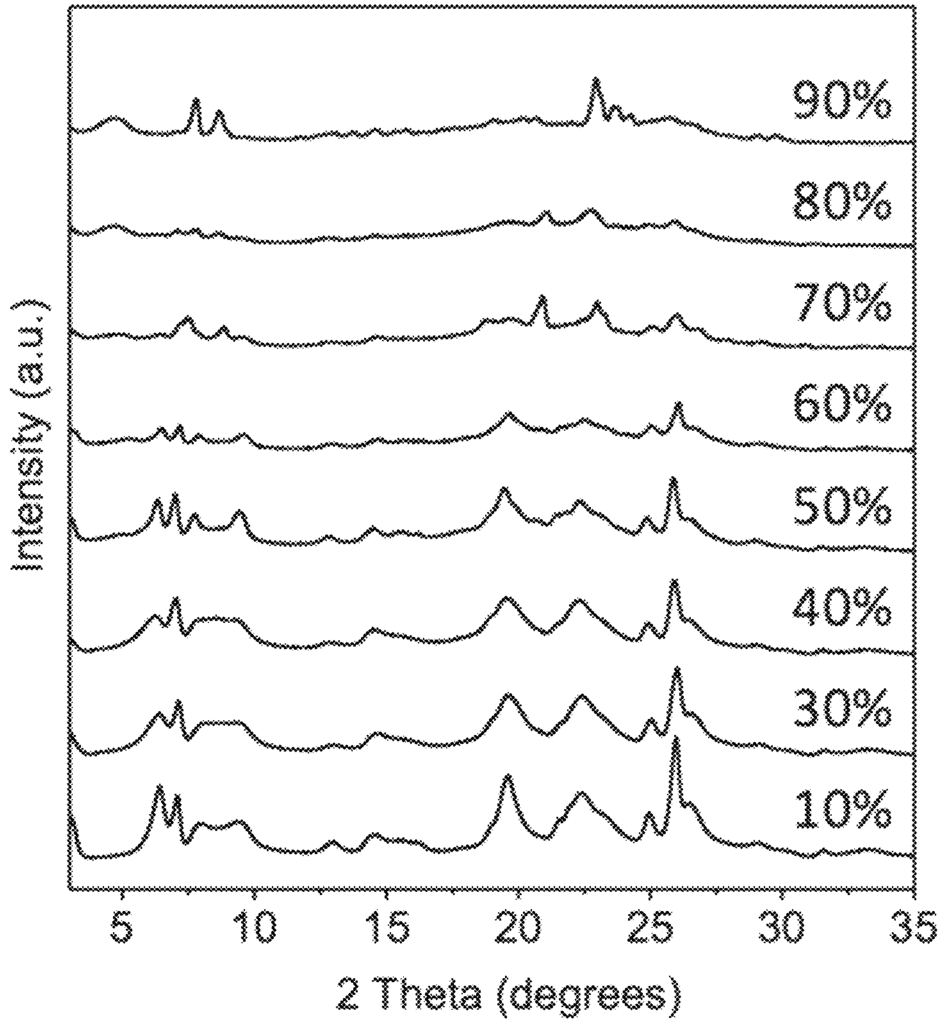
FIG. 1A shows PXRD patterns of as-synthesized delaminated Al-SSZ-70 zeolites synthesized with different molar amounts of CTAOH in the synthesis gel, as indicated by the percentages.

The present method allows one to prepare a delaminated Al-SSZ-70 zeolite. The process comprises contacting under crystallization conditions a reaction mixture comprising (1) a source of $Al_2O_3$; (2) a source of silica; (3) an imidazolium cation (OSDA); and (4) a cetyltrimethyl ammonium cation ($CTA^+$). In one embodiment, the reaction mixture further comprises (5) an Al-SSZ-70 zeolite seed. It is preferred that the Al-SSZ-70 seed has a Si/Al ratio of at least 50. The term Si/Al (silica to aluminum ratio) means a molar ratio of silicon oxide ($SiO_2$) to aluminum oxide ($Al_2O_3$).

The mole % of the $CTA^+$ generally ranges from 10 mol % to 60 mol %, based on the total organic components (OSDA+$CTA^+$). This is important. In another embodiment, the amount of $CTA^+$ ranges from 10 mol % to 50 mol %. In another embodiment, the $CTA^+$ ranges from 30 mol % to 60 mol %, or even 50 mol % to 60 mol %, based on the total organics in the reaction mixture. The $CTA^+$ cation can be provided when associated with any suitable anion, with hydroxide being the preferred anion. Providing the $CTA^+$ as CTAOH in the reaction mixture is preferred.

In preparing SSZ-70, an imidazolium cation selected from the group consisting of a 1,3-diisopropylimidazolium cation, a 1,3-diisobutylimidazolium cation, and a 1,3-dicyclohexylimidazolium cation is used as a structure directing agent ("OSDA"), also known as a crystallization template. The OSDAs useful in making SSZ-70 are represented by the following structures (1), (2) and (3):

(1)

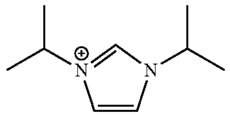

1,3-diisopropylimidazolium cation (2)

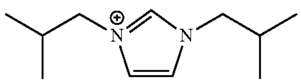

1,3-diisobutylimidazolium cation (3)

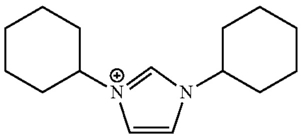

1,3-dicyclohexylimidazolium cation

The OSDA cation is typically associated with anions which can be any anion that is not detrimental to the formation of the zeolite. Representative anions include elements from Group 17 of the Periodic Table (e.g., fluoride, chloride, bromide and iodide), acetate, carboxylate, hydroxide, sulfate, and the like.

The alumina source can comprise a FAU framework zeolite. The FAU framework type zeolite can be an ammonium-form zeolite or a hydrogen-form zeolite. Examples of the FAU framework type zeolite include zeolite Y (e.g., CBV720, CBV760, CBV780, HSZ-HUA385, and HSZ-HUA390). Zeolite Y can have a $SiO_2/Al_2O_3$ molar ratio of from 30 to 500. The FAU framework type zeolite can comprise two or more zeolites. The two or more zeolites can be Y zeolites having different silica-to-alumina molar ratios. The FAU framework type zeolite can be the sole or predominant source of silicon and aluminum. Another appropriate source for the alumina can be sodium aluminate.

Separate sources of silicon include colloidal silica, fumed silica, precipitated silica, alkali metal silicates and tetraalkyl orthosilicates.

Crystallization of the SSZ-121 molecular sieve from the above reaction mixture can be carried out under either static, tumbled or stirred conditions in a suitable reactor vessel (e.g., a polypropylene jar or a Teflon-lined or stainless-steel autoclave) at a temperature of from 100 °C to 200 °C. (e.g., 150 °C to 175 °C) for a time sufficient for crystallization to occur at the temperature used (e.g., 1 day to 14 days, or 2 days to 10 days). The hydrothermal crystallization process is typically conducted under pressure, such as in an autoclave, and is preferably under autogenous pressure.

Once the molecular sieve crystals have formed, the solid product can be recovered from the reaction mixture by standard mechanical separation techniques such as centrifugation or filtration. The recovered crystals are water-washed and then dried to obtain the as-synthesized molecular sieve crystals. The drying step can be performed at an elevated temperature (e.g., 75 °C to 150 °C) for several hours (e.g., about 4 to 24 hours). The drying step can be performed under vacuum or at atmospheric pressure.

Once crystallized, the delaminated Al-SSZ-70 zeolite is recovered. The zeolite can be calcined or treated with ozone to remove OSDA. The recovered zeolite can exhibit a Si/Al ratio for at least 50. In one embodiment the Si/Al ratio ranges from 50 to 75.

The recovered delaminated Al-SSZ-70 zeolite, in one embodiment, is also recovered and subjected to high shear mixing. This can occur prior to calcination. The high shear mixing can comprise a high shear treatment of at least 1500 RPM for at least 1 minute. In one embodiment, the high shear mixing comprises a high shear treatment of at least 1500-3000 RPM for a period of time in the range of from 1 minute-30 minutes. In another embodiment, the high shear mixing comprises a high-shear treatment of at least 2500 RPM for at least 2 minutes, followed by a second high-shear treatment of at least 1700 RPM for at least 1 minute.

The use of high shear mixing has been found to bring about additional delamination and provide increased surface area. The recovered product can exhibit a surface area of at least 250 $m^2/g$ in one embodiment. In another embodiment, the product zeolite recovered after high shear mixing is at least 300 $m^2/g$, or even 340 $m^2/g$ or greater. The product can also exhibit a micropore volume greater than 0.1 $cm^3/g$, indicating substantial crystalline structure.

In the following discussion and examples, the powder X-ray diffraction patterns (PXRD) were collected using a Rigaku Ultima IV diffractometer equipped with a Cu Kα radiation source (λ=1.5406 Δ, 35 kV, 25 mA). SEM images were captured with a Hitachi S5000 microscope.

High resolution transmission electron microscopy (HR-TEM) images were captured using a JEOL JEM 2010 microscope in low-dose mode operating at 200 kV accelerating voltage and equipped with a LaB6 electron gun. Samples were prepared by embedding and curing in an epoxy resin followed by cutting thin sections (~30-50 nm) with a Leica EM UC7 ultramicrotome. The sections were floated on to 300 mesh Cu grids with a thin (20-30 nm) lacey carbon support film. Images were captured using a Gatan OneView 4k×4k camera. $N_2$ adsorption isotherms were measured at 77 K on a Micromeritics ASAP2020 adsorption instrument. Solid-state $^{13}C$ MAS NMR spectra were recorded on a Bruker DSX500 spectrometer and a Bruker 4 mm MAS probe under Bloch decay and cross-polarization MAS conditions. Thermogravimetry (TG) was carried out on a TA Instruments 2950 thermogravimetric analyzer.

More specifically, the present synthesis employs a mol ratio of CTAOH to OSDA from 1:9 to 6:4 in the reaction mixture. The importance of this can be seen when the one-pot synthesis of delaminated Al-SSZ-70 zeolite is conducted using varying CTAOH to OSDA ratios, while keeping the total organic hydroxide content fixed. The PXRD patterns of the corresponding as-synthesized samples are shown in FIG. 1A. The samples are prepared in Examples 1-3. The synthesis conditions are set forth in Table 4 below.

Figure 1B:
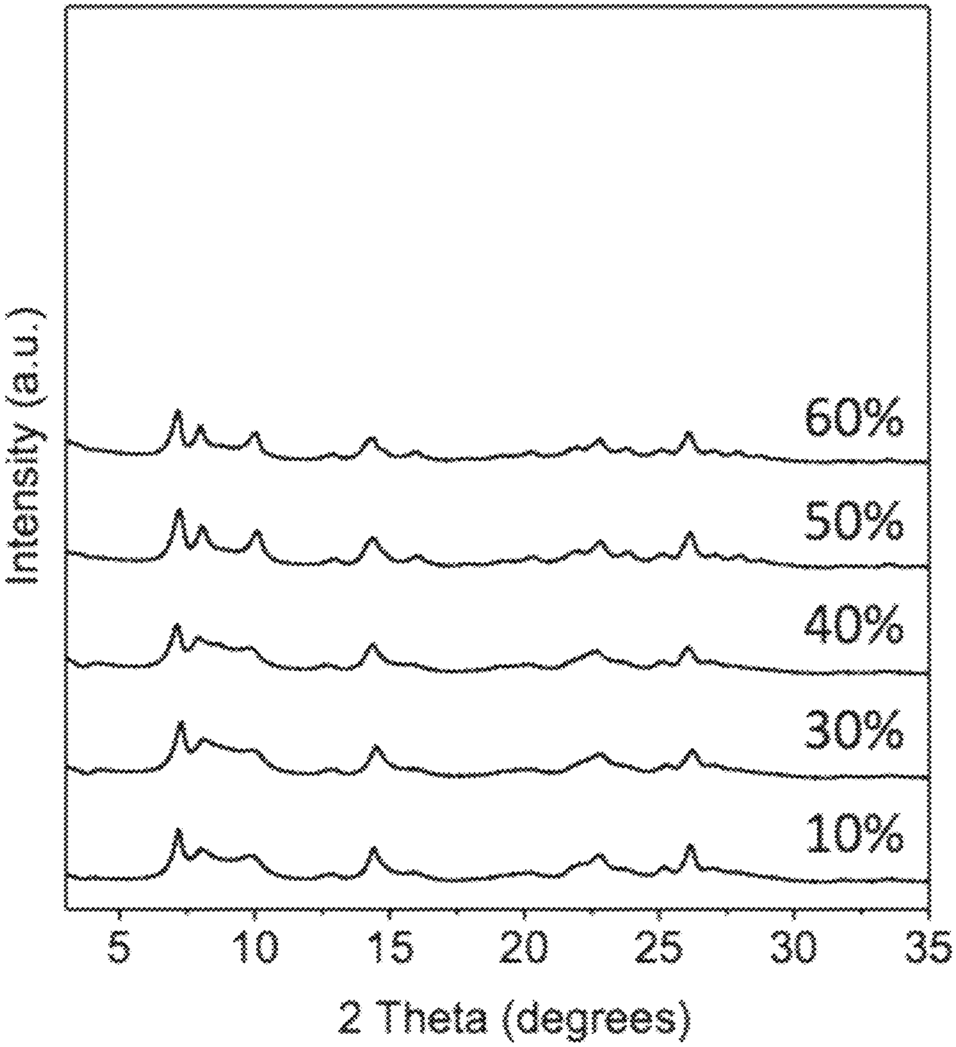
FIG. 1B shows PXRD patterns of present delaminated Al-SSZ-70 zeolites that have been directly calcined, but synthesized with different molar amounts of CTAOH in the synthesis gel, as indicated by the percentages.

Samples consisting of 10 mol % to 50 mol % CTAOH of the total organic hydroxide (total defined as mols of CTAOH+OSDA) exhibit PXRD patterns that are characteristic of Al-SSZ-70 zeolite. The obtained as-synthesized zeolite with 10 mol % CTAOH exhibited a more resolved PXRD pattern, indicating it possesses a highly crystalline MWW-type structure. Upon further increasing surfactant CTAOH content to 60 mol % CTAOH of the total organic hydroxides, a zeolite product with a much weaker MWW-structure PXRD intensity results, as shown in FIG. 1A, suggesting a profound effect of CTAOH on zeolite crystal growth. In addition, a small amount of an additional phase is observed in the as-synthesized zeolite product in the 50 mol % and 60 mol % CTAOH samples in FIG. 1A, which is indicated by the appearance of a small PXRD peak at around 5 degrees. This seems to be due to a small amount of mesoporous amorphous-silica phase in these two materials. The crystalline Al-SSZ-70 zeolite dominates as the main phase over the amorphous one in the products, because the (310) reflection at a 2θ value of 26-27 degree is still resolved. This indicates long-range ordering of the crystalline MWW layer. At an even higher amount of CTAOH surfactant of 70 mol %-90 mol % in the synthesis gel, mixed phases are observed with a greater proportion of amorphous silica, in addition to the presence of an MFI impurity phase in the as-synthesized product in FIG. 1A. This result suggests that with less OSDA (i.e., diisobutylimidazolium hydroxide), the $CTA^+$ surfactant plays a major role in directing the formation of amorphous silicate materials as well as an additional minor impurity phase consisting of an MFI-type zeolite. Therefore, the data above indicate that the amount of CTAOH surfactant should be carefully controlled within 10 mol %-60 mol %, in order to achieve a cleaner synthesis of the desired delaminated SSZ-70 zeolite as the main phase. The PXRD patterns of calcined samples are shown in FIG. 1B and exhibit well-resolved PXRD patterns corresponding to Al-SSZ-70 zeolite.

Figure 1C:
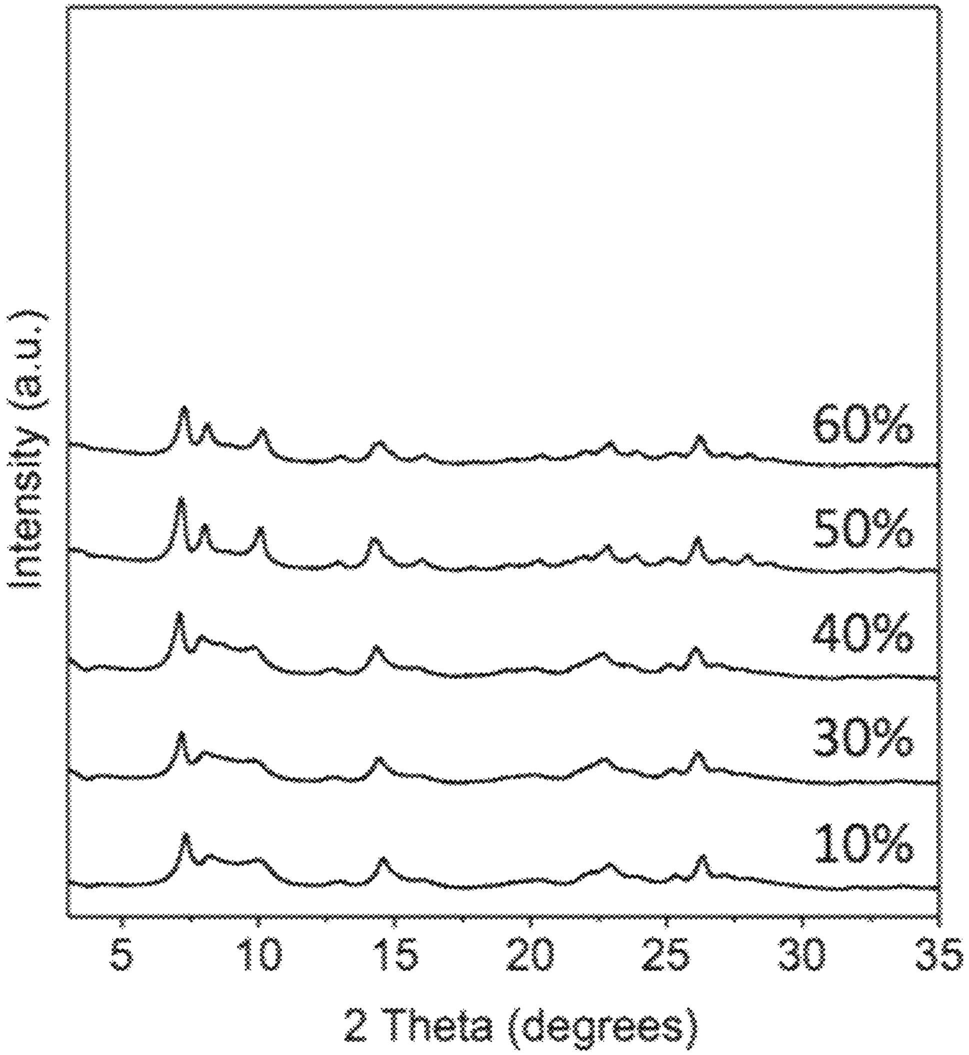
FIG. 1C shows PXRD patterns of as-synthesized Al-SSZ-70 zeolites after a high-stear mixing treatment, the samples synthesized with different molar amounts of CTAOH in the synthesis gel, as indicate by the percentages.
Figure 2A:
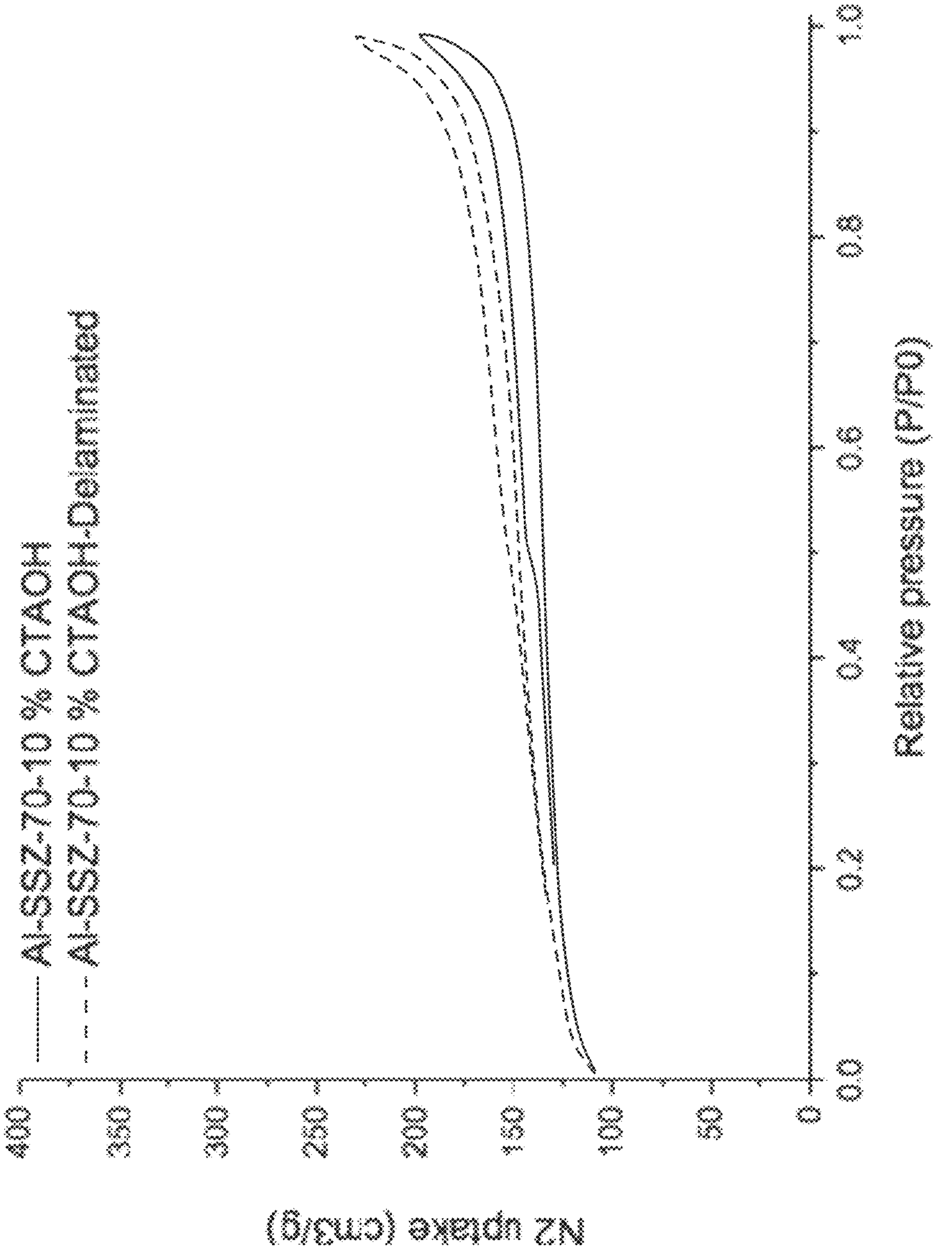
FIGS. 2A-D show $N_2$ physisorption isotherms of directly calcined and high-shear mixed Al-SSZ-70 zeolites with 10 mol % CTAOH (FIG. 2A), 30 mol % CTAOH (FIG. 2B), 50 mol % CTAOH (FIG. 2C), and 60 mol % CTAOH (FIG. 2D).
Figure 2B:
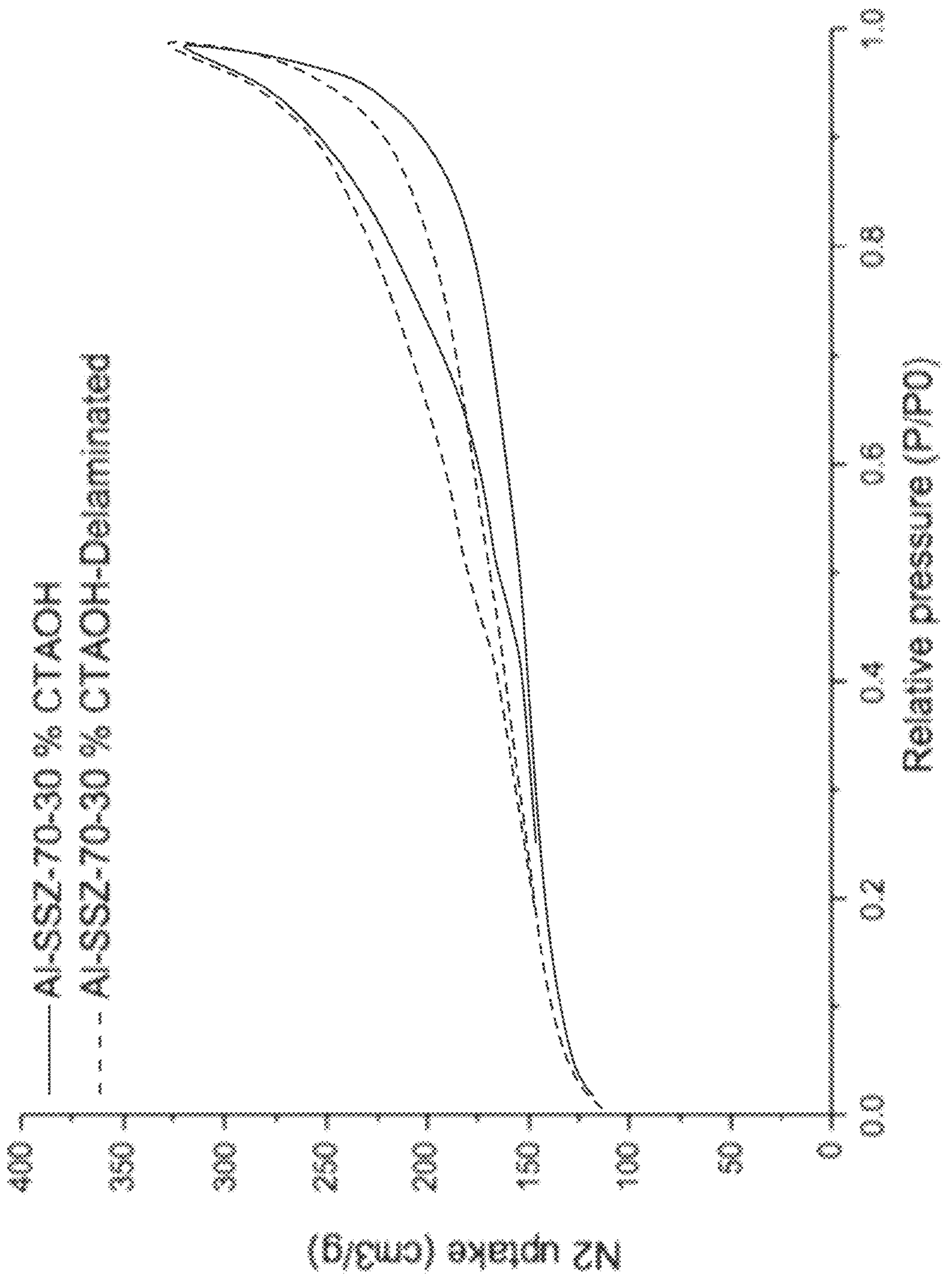
Figure 2C:
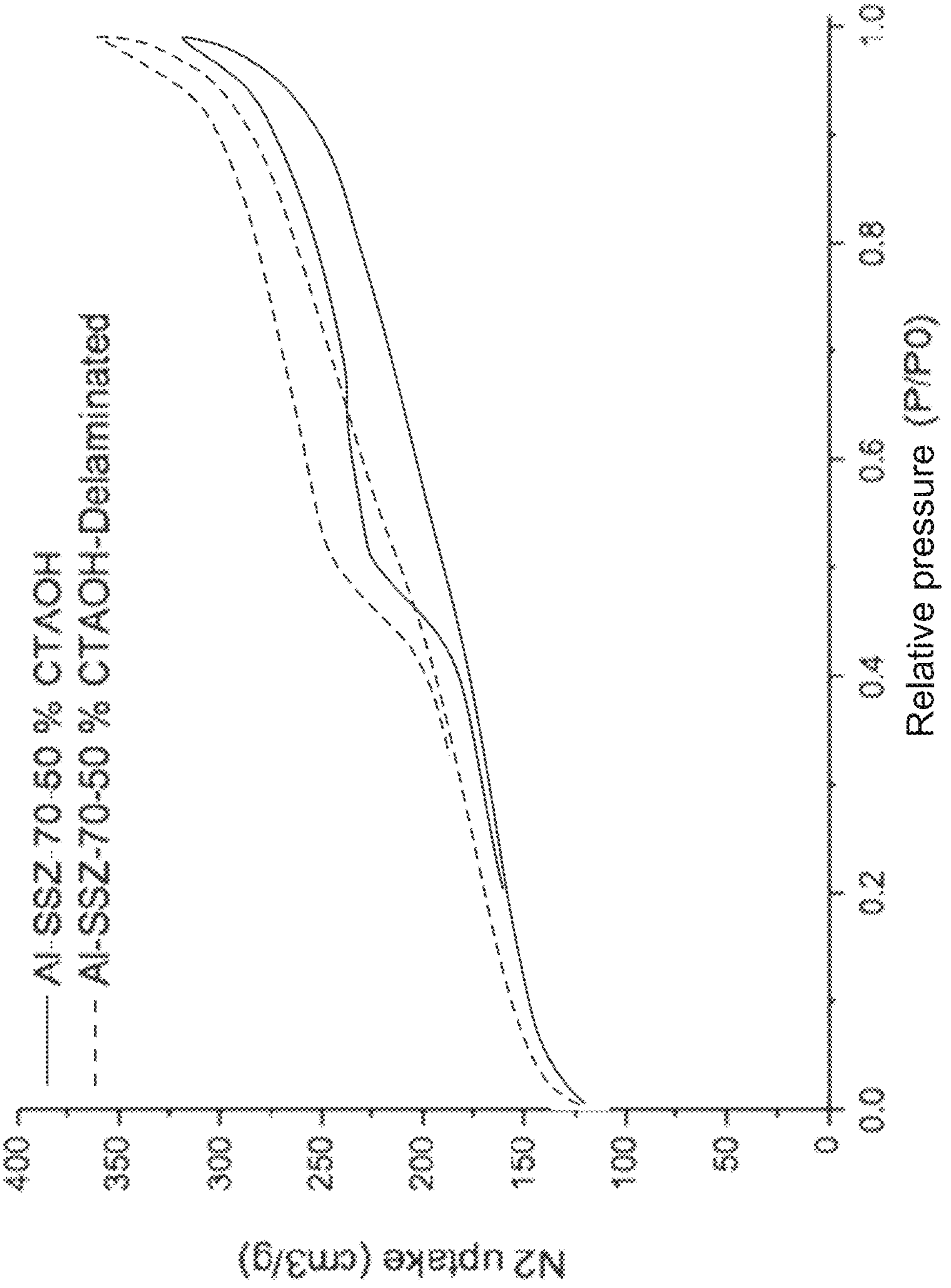
Figure 2D:
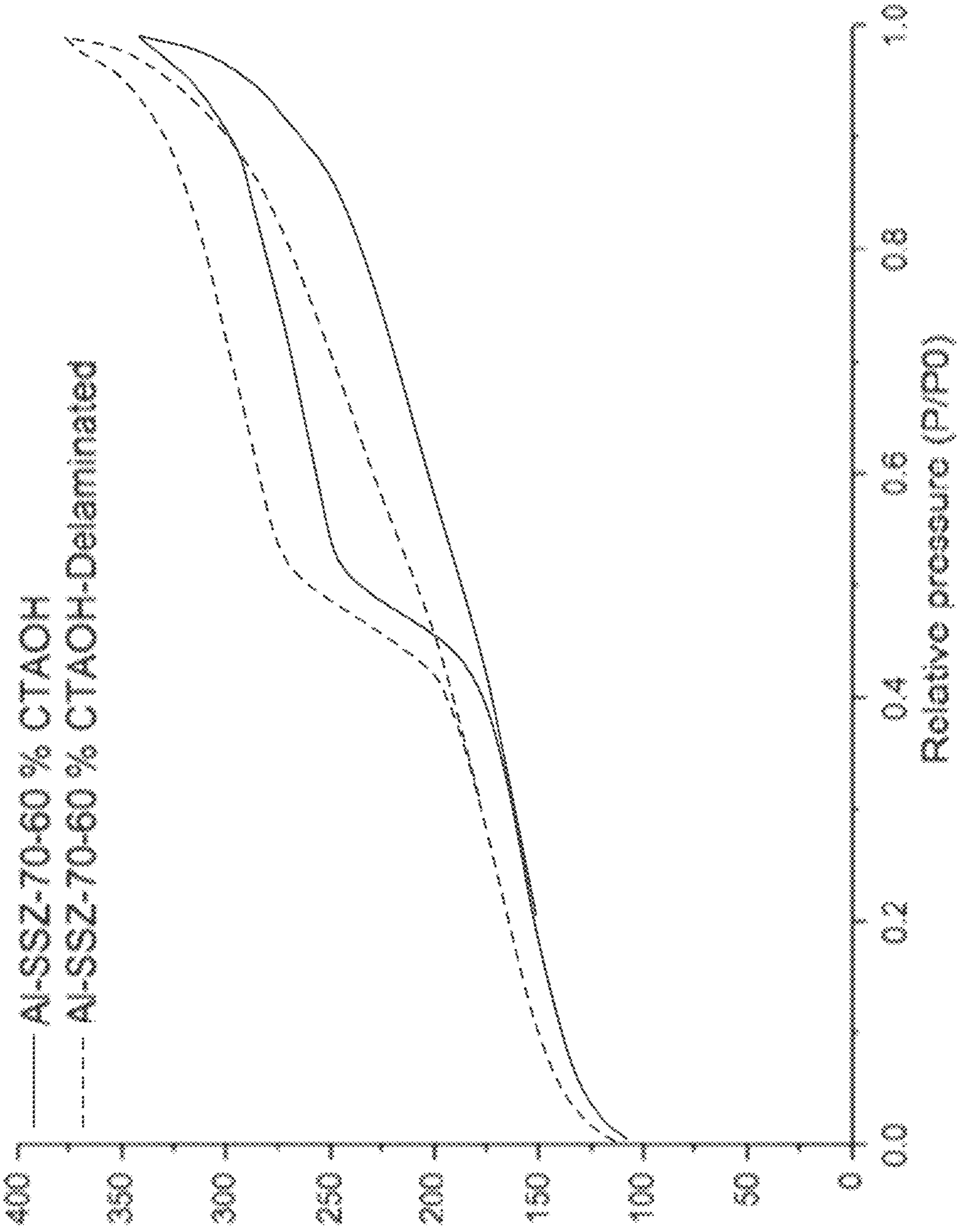

In addition to direct calcination, high-shear mixing of the as-synthesized Al-SSZ-70 zeolites is employed. This affects further delamination. The PXRD patterns of these high-shear mixed samples after their calcination are shown in FIG. 1C and exhibit similar PXRD patterns as the corresponding directly calcined Al-SSZ-70 zeolite materials shown in FIG. 1C, without high-shear mixing. This result indicates that the crystalline structure is kept intact without significant degradation during the high-shear mixing treatment.

In addition to the crystal structure, the porosity of the obtained zeolite samples is also of interest. The $N_2$ physisorption isotherms of the corresponding directly calcined zeolite products (with 10 mol %, 30 mol %, 50 mol % and 60 mol % CTAOH during hydrothermal synthesis) are shown in FIGS. 2A-D. When one considers that the Al-SSZ-70 zeolite seed (used in the amount of 5 wt. % in each zeolite synthesis) is synthesized without CTAOH, the control Al-SSZ-70 (0%) of directly calcined zeolite had an external surface area of 161 $m^2/g$, as shown in Table 2. This is comparable to several MWW-type zeolite materials in the literature, with a certain degree of delamination arising during synthesis. With 10 mol % CTAOH in the synthesis (synthesis condition is entry 1 of Table 4 in Example 2), the external surface area of the calcined zeolite was 117 $m^2/g$ (Table 1 below, Al-SSZ-70 (10%)), indicating that a small amount of CTAOH surfactant did not increase the degree of delamination of MWW zeolite layers during synthesis, and may have in fact slightly decreased it. This is in agreement with the highly resolved PXRD pattern shown in FIG. 1B.

However, when the CTAOH mole fraction in the synthesis gel increased to above 30 mol %, the external surface area of the directly calcined zeolite became significantly higher in Table 1, consistent with an increasing degree of delamination. It should be noted that with 50 mol % or 60 mol % CTAOH in the synthetic gel, the external surface area of the corresponding directly calcined Al-SSZ-70 zeolites is 257 $m^2/g$ or 301 $m^2/g$ in Table 1 below, respectively. These values are significantly higher than those of previously reported delaminated Al-SSZ-70 zeolites. They approach and equal the surface area previously reported for the diquat-delaminated DS-ITQ-2. Therefore, the physisorption results indicate that the partial replacement of OSDA with surfactant $CTA^+$ favors the delamination of MWW layers during hydrothermal synthesis. In addition to the external surface area, the mesopore volume also increased with the increasing amounts of CTAOH from 10 mol % to 60 mol % in the synthesis gel, while both micropore surface area and micropore volume decreased accordingly. For example, based on data in Table 1, with 60 mol % CTAOH, the directly calcined zeolite has a low micropore volume of 0.107 $cm^3/g$, which is significantly lower than 0.134 $cm^3/g$ for Al-SSZ-70 synthesized without CTAOH surfactant. This further supports the delamination of MWW layers with the assistance of CTAOH surfactant. It should be mentioned that the increased external surface area and mesopore volume is not likely due to be caused by the formation of an amorphous mesoporous phase, which is indicated by PXRD data in FIG. 1C, because the micropore volume of greater than 0.1 $cm^3g$ implies still a high percentage of crystalline microporous phase.

The effect of high-shear mixing treatment prior to calcination, for the as-synthesized Al-SSZ-70 zeolites without CTAOH, as well as those materials synthesized with 10 mol %-60 mol % CTAOH in the synthesis gel demonstrates a positive effect in delamination when using $CTA^+$. Based on $N_2$ physisorption results, an external surface area of 146 $m^2/g$ in Table 1 decrease slightly for Al-SSZ-70 zeolite with 0 mol % CTAOH after high-shear mixing compared with the directly calcined analogue (compare with 161 $m^2/g$, Table 1). This indicates that this post-synthetic approach is ineffective for delaminating MWW zeolite layers on its own, in the absence of CTAOH. On the other hand, for the as-synthesized Al-SSZ-70 zeolite with 10 mol % 60 mol % surfactant CTAOH, the external surface area increased after high-shear mixing treatment, compared to the corresponding directly calcined samples in Table 1. The Al-SSZ-70 zeolite synthesized with 60 mol % CTAOH exhibits after high-shear mixing an external surface area of 347 $m^2 g^{-1}$ (compared with the directly calcined external surface area of 301 $m^2 g^{-1}$). This increase in the external surface area upon high shear mixing of the as-synthesized Al-SSZ-70 zeolites emphasizes a unique feature of the present synthetic route. The presence of surfactant CTAOH in hydrothermal synthesis not only favors the direct delamination to form a hierarchical porous system during hydrothermal synthesis, but it also facilitates the formation of a higher degree of delamination via post-synthetic high-shear mixing. Therefore, the present approach of using surfactant CTAOH and OSDA as dual organic additives during Al-SSZ-70 zeolite synthesis demonstrates the possibility of constructing a hierarchical MWW zeolite with a highly delaminated architecture and a high framework Si/Al composition of 50, by using this combined approach.

TABLE 1

Physisorption data of Al-SSZ-70 zeolites that were synthesized with different amounts of CTAOH and after high-shear mixing (HSM).[a]

| Sample | BET SA[b] ($m^2/g$) | Micro SA[b] ($m^2/g$) | Meso SA[b] ($m^2/g$) | Total PV[c] ($cm^3/g$) | Micro PV[c] ($cm^3/g$) | Meso PV[c] ($cm^3/g$) |
|---|---|---|---|---|---|---|
| Al—SSZ-70 (0%) | 493 | 332 | 161 | 0.434 | 0.134 | 0.300 |
| Al—SSZ-70 (0%)-HSM | 458 | 311 | 146 | 0.398 | 0.125 | 0.273 |
| Al—SSZ-70 (10%) | 484 | 367 | 117 | 0.310 | 0.154 | 0.156 |
| Al—SSZ-70 (10%)-HSM | 502 | 342 | 160 | 0.353 | 0.142 | 0.211 |
| Al—SSZ-70 (30%) | 533 | 349 | 184 | 0.504 | 0.140 | 0.364 |
| Al—SSZ-70 (30%)-HSM | 545 | 319 | 226 | 0.516 | 0.129 | 0.387 |
| Al—SSZ-70 (50%) | 584 | 327 | 257 | 0.494 | 0.132 | 0.362 |
| Al—SSZ-70 (50%)-HSM | 620 | 306 | 314 | 0.570 | 0.125 | 0.445 |
| Al—SSZ-70 (60%) | 563 | 262 | 301 | 0.537 | 0.107 | 0.430 |
| Al—SSZ-70 (60%)-HSM | 599 | 252 | 347 | 0.595 | 0.101 | 0.494 |

[a]Data listed in Table 1 were calculated based on the $N_2$ physisorption isotherms at 77 K.
[b]SA: surface area.
[c]PV: pore volume.

Figure 3B:
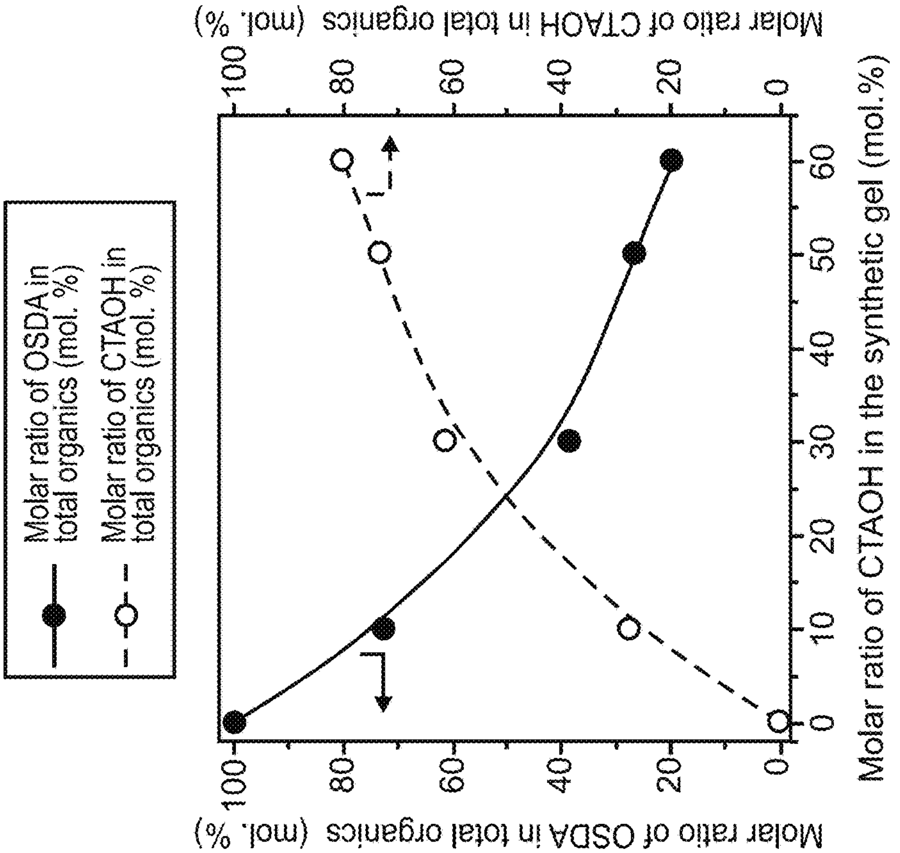
FIG. 3A graphically shows weight percentage and FIG. 3B molar percentage of OSDA and $CTA^+$ in as-synthesized samples that were synthesized with different molar amounts of CTAOH.
Figure 3A:
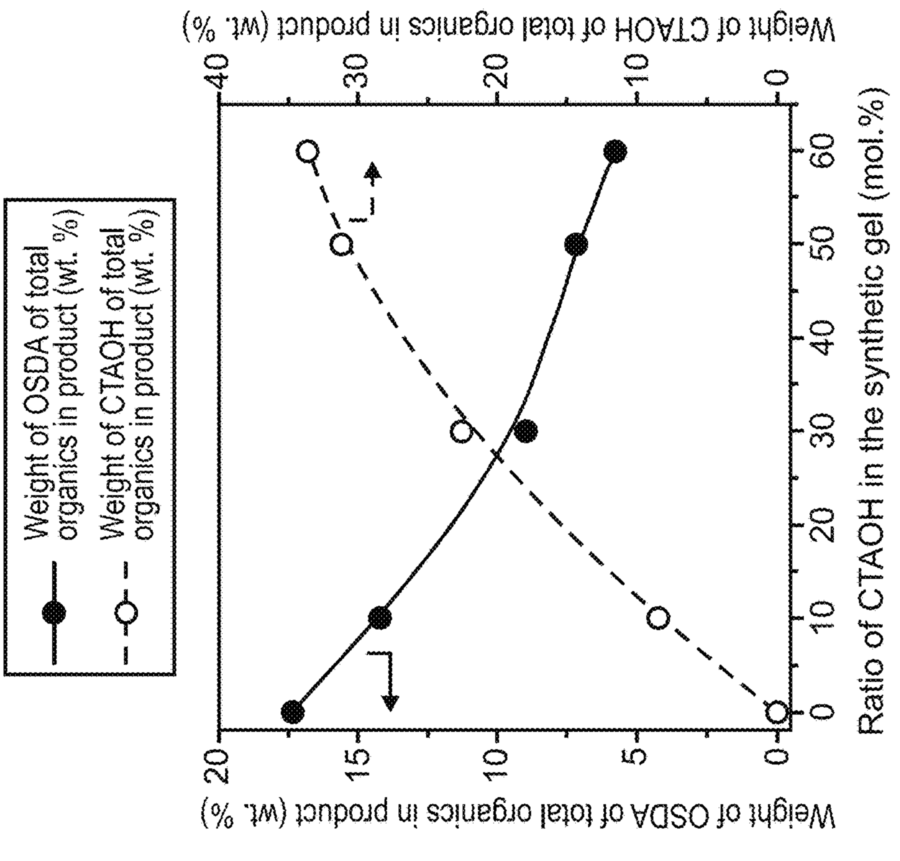

The partial replacement of OSDA by surfactant CTAOH was also confirmed by the combination of TGA and CHN analysis data. As shown in FIGS. 3A and B, increasing CTAOH amounts in the synthesis gel led to a corresponding increase in the surfactant content in the as-synthesized zeolite products. For example, the weight percentage of $CTA^+$ in the as-synthesized zeolite product of Al-SSZ-70 (50%) and Al-SSZ-70 (60%) was found to be in the range of 30 wt. %-35 wt. %, with the corresponding molar percentage of $CTA^+$ calculated to be around 70 mol %-80 mol % in the final as-synthesized zeolite. This replacement effect of OSDA by CTAOH surfactant in the as-synthesized Al-SSZ-70 zeolite sample is consistent with the observation of enhanced external surface area upon increasing the amount of $CTA^+$ surfactant during synthesis. This result supports the hypothesis that the presence of high amounts of surfactants favors the formation of highly delaminated Al-SSZ-70 zeolite during hydrothermal synthesis.

Figure 4A:
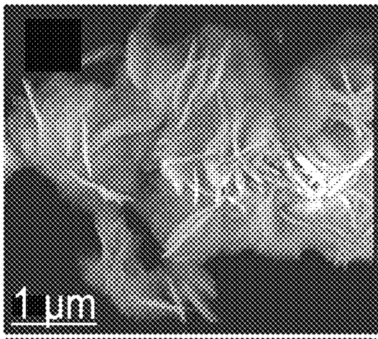
FIGS. 4A-H show SEM images of calcined Al-SSZ-70 zeolites that were hydrothermally synthesized with 10 mol % CTAOH (FIG. 4A), 30 mol % CTAOH (FIG. 4C), 50 mol % CTAOH (FIG. 4E), and 60 mol % CTAOH (FIG. 4G), with the corresponding samples after high-shear mixing for 10 mol % CTAOH (FIG. 4B), 30 mol % CTAOH (FIG. 4D), 50 mol % CTAOH (FIG. 4F), and 60 mol % CTAOH (FIG. 4H).
Figure 4B:
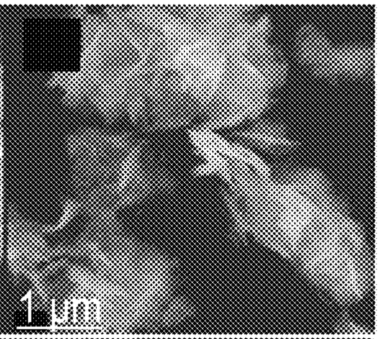
Figure 4C:
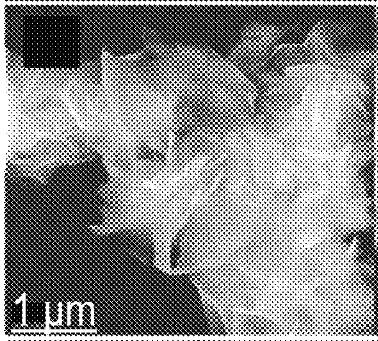
Figure 4D:
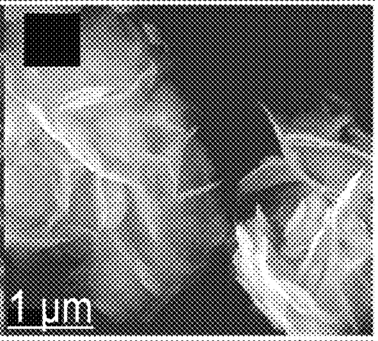
Figure 4E:
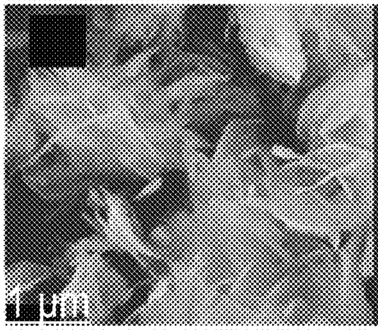
Figure 4F:
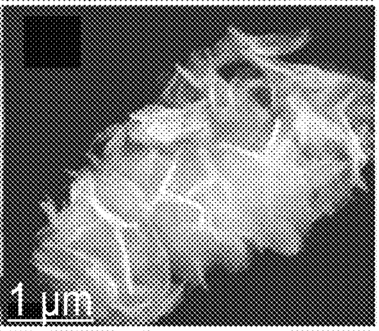
Figure 4G:
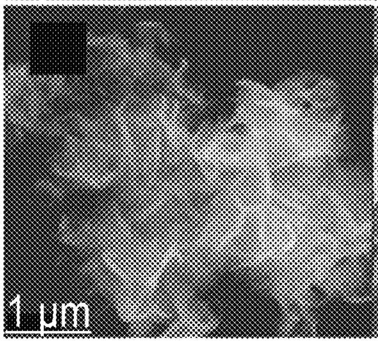
Figure 4H:
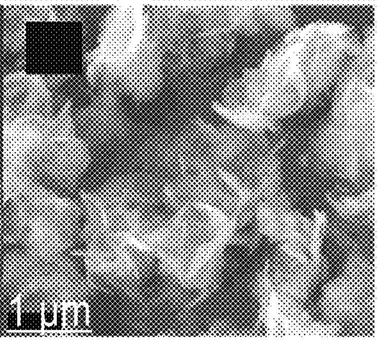

In FIGS. 4A, C, E, and G, SEM images of calcined Al-SSZ-70 zeolites that were synthesized with 10 mol %, 30 mol %, 50 mol % and 60 mol % CTAOH show a typical flower-like morphology for MWW-type zeolite, while the observed crystal thickness decreases at high contents of CTAOH in the synthesis. In particular, Al-SSZ-70 zeolite with 60 mol % CTAOH exhibits a morphology consisting of much thinner layers (FIG. 4G), which are bent and curved. The corresponding zeolites after high-shear mixing treatment display similar morphology as their directly calcined analogue, but crystal particles are further broken into smaller pieces (FIGS. 4B, 4D, 4F and 4H), consistent with what is expected with further zeolite delamination.

Figure 5A:
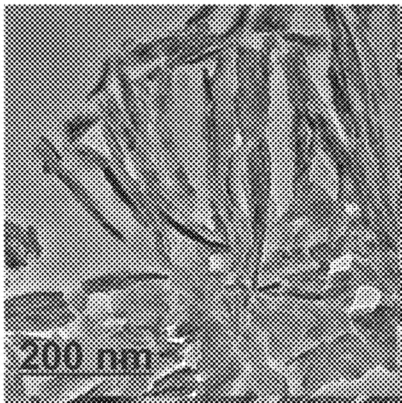
FIGS. 5A-H show TEM images of Al-SSZ-70(0%) zeolite (FIGS. 5A and 5B), Al-SSZ-70 (0%)-HSM zeolite (FIGS. 5C-D), and Al-SSZ-70(60%)-HSM zeolite (FIGS. 5E-F).
Figure 5B:
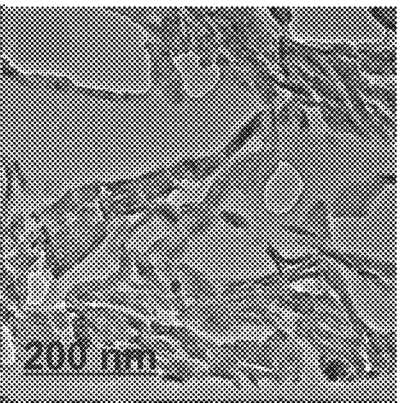
Figure 5C:
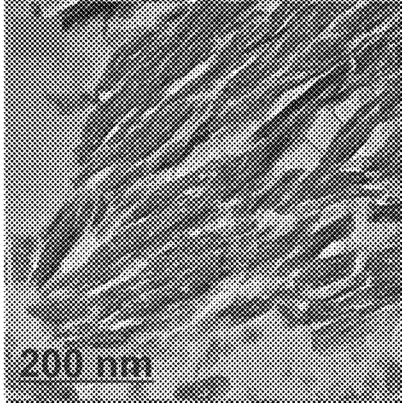
Figure 5D:
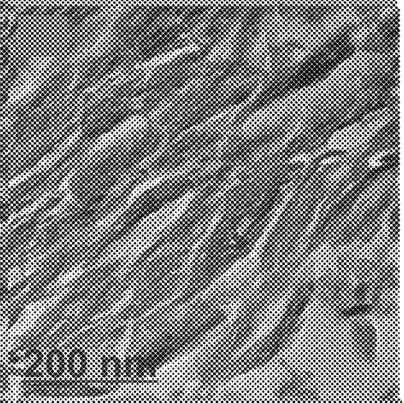
Figure 5E:
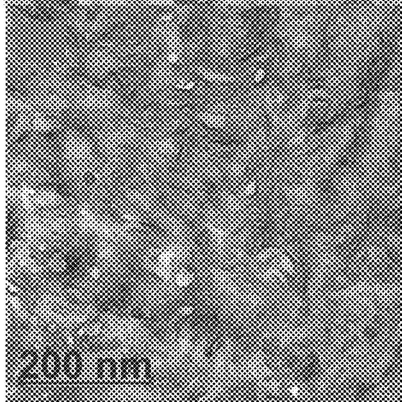
Figure 5F:
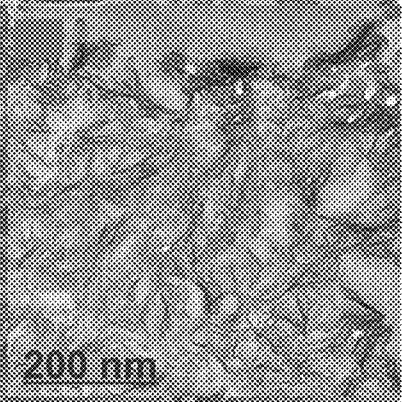

To better understand the combined influence of post-synthetic high-shear mixing and hydrothermal synthesis involving CTAOH, Al-SSZ-70 zeolites synthesized with 0 mol % and 60 mol % CTAOH after high-shear mixing can be reviewed by TEM imaging. Images of the latter sample are shown in FIGS. 5E and 5F. These data confirm a large proportion of single MWW layers, which are fully delaminated and disorderly stacked. Most of these single MWW-layers are curved, which is similar to the morphology observed by SEM, and consistent with delaminated layers. These images are in contrast to those in FIGS. 5A and 5B, representing the control Al-SSZ-70 zeolite with 0 mol % CTAOH in the synthesis gel after high-shear mixing, which exhibit a bulk crystal morphology that is composed of multiple MWW layers.

Figure 5G:
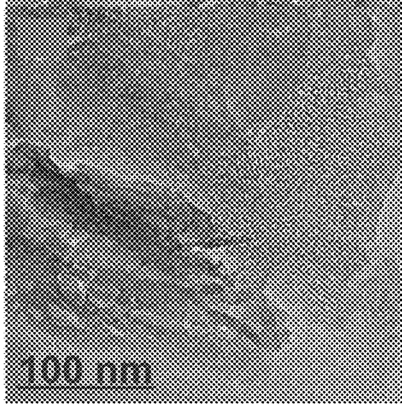
Figure 5H:
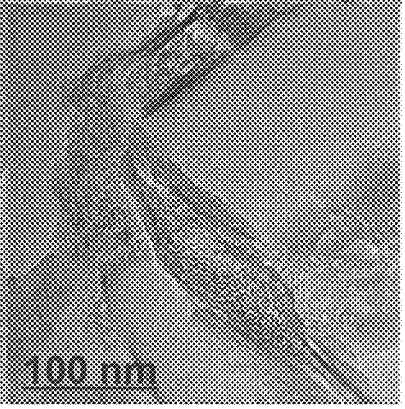

In FIGS. 5G and 5H, some reticular mesoporous amorphous phases are observed, in the same delaminated material as shown in FIGS. 5E and 5F (i.e., Al-SSZ-70 (60%)-HSM) described above. This indicates that a high content of surfactant, such as the 60 mol % CTAOH substitution level for OSDA, also induces the formation of a minor amorphous aluminosilicate phase during hydrothermal synthesis. This amorphous phase is believed responsible for the minor PXRD peak at around 5 degrees 2θ for the 60 mol % CTAOH as-synthesized material in FIG. 1A. This assignment is consistent with previous observations of the PXRD reflection around 5 degrees 2θ in amorphous mesoporous materials. The presence of this minor peak cannot be due to swollen MWW layers in the precursor, since no such swollen MWW layers were observed by TEM imaging.

Figure 6:
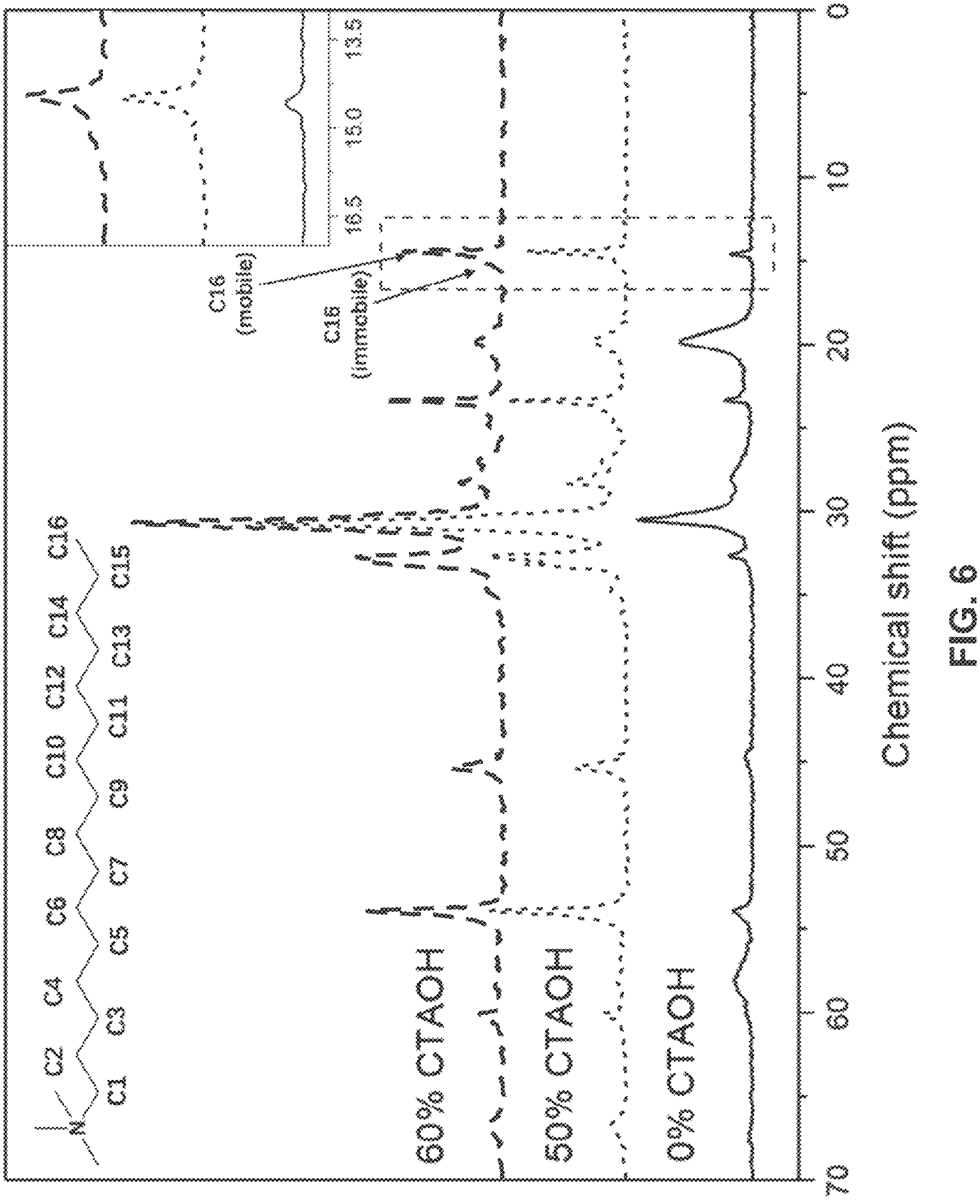
FIG. 6 shows C NMR spectra of Al-SSZ-70 zeolites that were synthesized with 0 mol % CTAOH, 50 mol % CTAOH and 60 mol % CTAOH.

It is of interest to compare the amorphous phase in the Al-SSZ-70 zeolite sample synthesized with 60 mol % CTAOH in the synthesis gel using $^{13}C$ MAS NMR spectroscopy, with the possible presence of an amorphous phase in Al-SSZ-70 materials that were synthesized with lower CTAOH substitution levels of 10 mol % and 50 mol % CTAOH. The Al-SSZ-70 with 10 mol % CTAOH, which exhibits NMR resonances arising from both OSDA and $CTA^+$ cations is shown in FIG. 6. The coexistence of OSDA and $CTA^+$ cations is consistent with the organic compositions in the as-synthesized zeolite by CHN analysis data in FIGS. 3A and B. The sharpness of the $CTA^+$ resonances in FIG. 6 suggests a mobile environment for $CTA^+$ cations in Al-SSZ-70 (10%). However, at a high $CTA^+$-surfactant content of 50 mol % and 60 mol %, the NMR spectra of the obtained zeolite exhibit two distinct environments for the $CTA^+$ cations. One environment corresponds to a resonance around 14.5-15 ppm in FIG. 6, which is representative of a characteristic sharp resonance for Al-SSZ-70 zeolite synthesized with 10 mol % CTAOH. In addition, a shoulder around 15 ppm is observed for Al-SSZ-70 zeolite with 50 mol % and 60 mol % CTAOH, which is attributed to the same head group of $CTA^+$ cations, but in a more confined and less mobile environment in which it is part of a confined surfactant assembly. An enhanced signal intensity is observed for the resonance at 15 ppm for Al-SSZ-70 zeolite with 60 mol % CTAOH compared with that synthesized with 50 mol % CTAOH. Considering the presence of amorphous phase via TEM for Al-SSZ-70 zeolite with 60 mol % CTAOH, which is templated by surfactant assembly, this amorphous phase may be responsible for the appearance of the NMR shoulder at 15 ppm, which is related to $CTA^+$ cations that are confined in the mesopore channels. Therefore, the above results indicate that the use of 60 mol % CTAOH likely caused the formation of a minor amorphous phase in the final product.

The results above highlight the ongoing challenge of breaking order in the precursor in the z (i.e., along the c axis) direction, without also synthesizing an amorphous phase. The CTAOH substitution levels used in the present method of Al-SSZ-70 synthesis are in the range of 50 mol %-60 mol % with minimal amorphous phase.

Of interest is also the distribution of acid sites in the delaminated Al-SSZ-70 prepared by the present method. (H)Al-SSZ-70(60%)-HSM catalyst as well as two Al-SSZ-70 controls synthesized in the absence of a CTA surfactant, both with and without high-shear mixing ((H)Al-SSZ-70 (0%) and (H)Al-SSZ-70 (0%)-HSM), were studied using pyridine as a relevant probe. The procedure is described in Example 4 below.

Figure 7A:
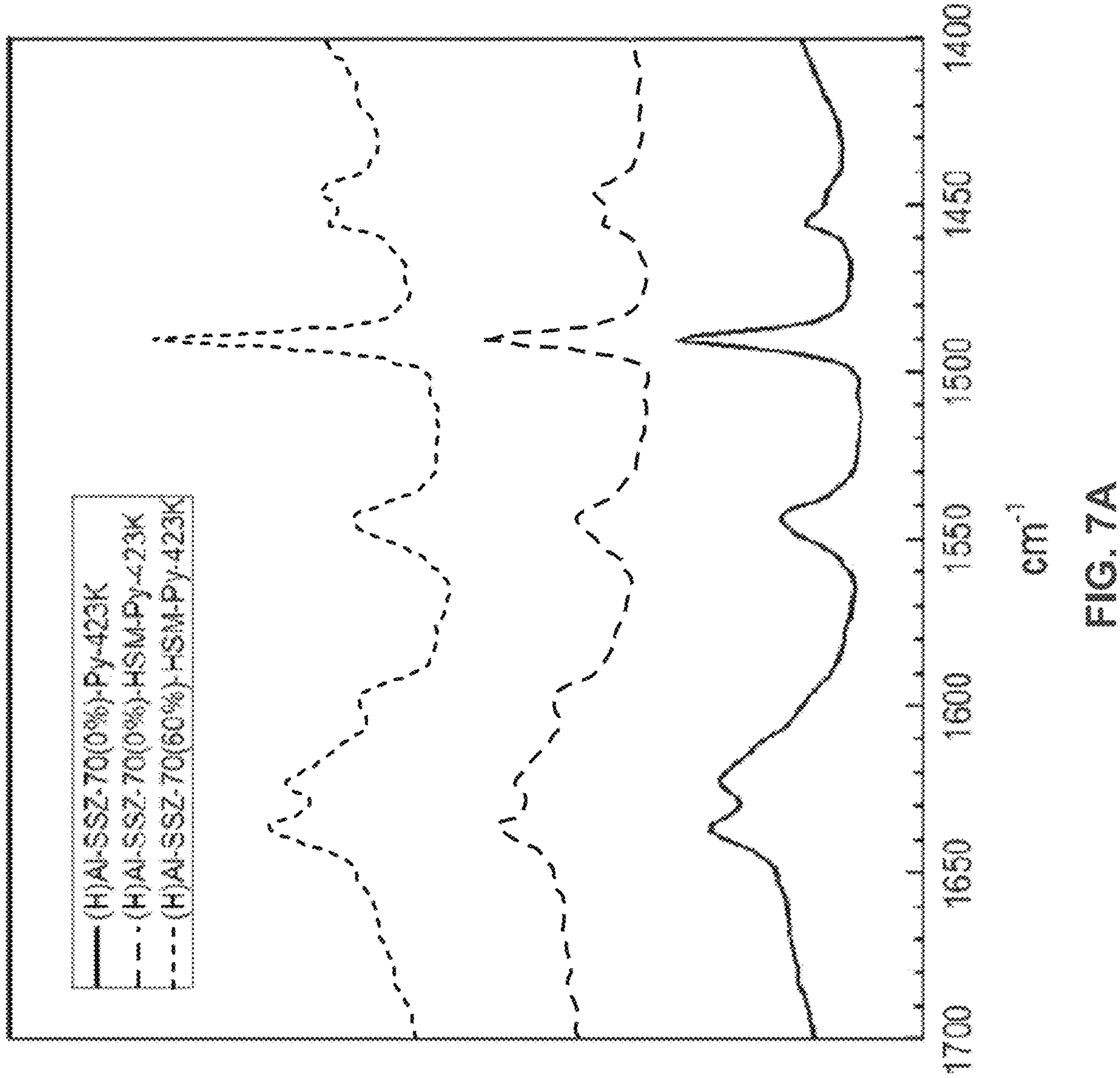
FIGS. 7A and 7B show transmission FTIR spectra of pyridine desorbed at 423K (FIG. 7A) and 523K (FIG. 7B) in (H)Al-SSZ-70(0%), (H)Al-SSZ-70(0%)-HSM and (H)Al-SSZ-70(60%)-HSM. The spectra are normalized to Si—O—Si overtones within the 1740-2080 $cm^{-1}$ region.
Figure 7B:
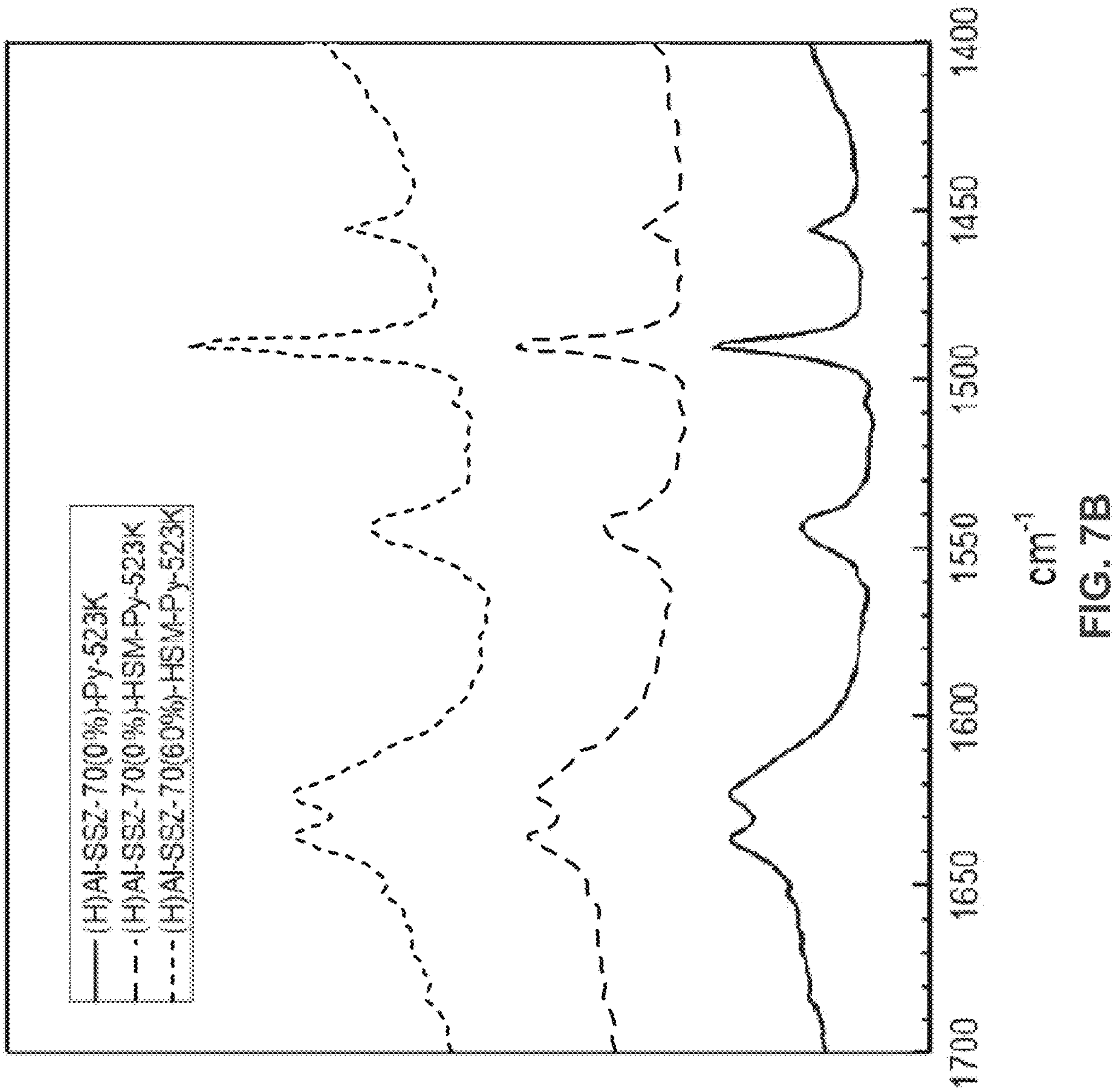

Data shown in Table 2 demonstrate that all three catalysts have the same total numbers of acid sites, as probed gravimetrically via pyridine adsorption at a temperature of 423 K, and this number is around 290 μmol/g. The pyridine total acid site count in Table 2 for (H)Al-SSZ-70(0%) is the same as previously reported for Al-SSZ-70. The delamination procedure including high-shear mixing treatment does not alter the number density of total acid sites within the zeolite. In terms of the distribution of acid sites, data in FIGS. 7A and B generally demonstrate both Lewis (1454 $cm^{-1}$), Brøsnsted (1544 $cm^{-1}$), and weakly physiosorbed pyridine (1445 $cm^{-1}$). These data show similar normalized L/B (Lewis to Brøsnsted) band area ratios, for both the delaminated (H)Al-SSZ-70(60%)-HSM sample as well as control Al-SSZ-70 materials, which were synthesized in the absence of $CTA^+$. Neither high-shear mixing nor substitution of $CTA^+$ surfactant for OSDA changes these ratios (or equivalently the distribution of acid sites) in any significant way.

TABLE 2

Calculated integrated band areas corresponding to Lewis (L, 1449 $cm^{-1}$) and Brønsted (B, 1544 $cm^{-1}$) acid sites at various desorption temperatures listed at the top of the Table. Spectra were all acquired at 323 K under vacuum, after 1 hour of treatment at the specified desorption temperature in Ar (50 mL/min).

| | T = 423 K | | | T = 473 K | | | T = 523 K | | | Total Pyridine Acid-Site Count |
|---|---|---|---|---|---|---|---|---|---|---|
| Sample | L | B | L/B | L | B | L/B | L | B | L/B | (μmol/g) |
| (H)Al—SSZ-70(0%) | 0.99 | 2.90 | 0.34 | 0.97 | 2.92 | 0.33 | 1.03 | 2.63 | 0.39 | 290 |
| (H)Al—SSZ-70(0%)-HSM | 0.87 | 2.39 | 0.36 | 0.90 | 2.78 | 0.32 | 0.91 | 2.83 | 0.32 | 283 |
| (H)Al—SSZ-70(60%)-HSM | 1.78 | 3.91 | 0.45 | 1.50 | 4.52 | 0.33 | 1.59 | 4.42 | 0.36 | 298 |

Friedel-Crafts acylation of 2-methoxynaphthalene (2-MN) and acetic anhydride as a relevant probe reaction was also studied, and the run specifics are set forth in Example 5 below. The delaminated (H)Al-SSZ-70 (60%)-HSM was compared with two other calcined control catalysts, consisting of the same two materials investigated in FIGS. 7A and B, and Table 2 above—(H)Al-SSZ-70 (0%) as well as (H)Al-SSZ-70 (0%)-HSM. Data shown in Table 3 below summarize the results. For all catalysts, the predominant product observed (>90%) was 1-acetyl-2-methoxynaphthalene (1,2-AMN), in agreement with prior work. Due to the harsh reaction conditions (120 °C and lack of rigorously anhydrous conditions), significant coking (used catalysts were black) and lack of a complete material-balance closure during catalysis was observed. Despite this, data shown in Table 4 demonstrate that both control catalysts had the same rate of 1,2-AMN product formation, leading one to conclude that high-shear mixing on its own was ineffective in increasing external acid-site accessibility. In comparison, the sample with the greatest amount of external surface area, delaminated Al-SSZ-70 with 60% CTAOH in the synthesis gel, had a 1.7-fold higher rate of production of the 1,2-AMN product. In addition, this catalyst had at least a 1.2-fold higher rate of 2-MN reaction than either one of the controls. This delaminated Al-SSZ-70 with 60% CTAOH in the synthesis gel was a superior catalyst, and its enhanced catalytic performance correlates to the increased external surface area and accessibility of external acid sites.

TABLE 3

Catalytic results of Friedel-Crafts acylation of 2-methoxynapthalene (2-MN) using acetic anhydride as the acylating agent.

| Sample | 2-MN conv. (%) | Selectivity (%) 1,2-AMN | 2,6-AMN | 2,8-AMN | Rate of 2-MN reacted (mmol 2-MN conv/hr) | Rate of 1,2-AMN formed (mmol 1-2-AMN formed/hr) |
|---|---|---|---|---|---|---|
| (H)Al—SSZ-70(0%) | 15.8 | 90.9 | 6.3 | 2.8 | 0.026 | 0.019 |
| (H)Al—SSZ-70(0%)-HSM | 21.8 | 91.0 | 7.1 | 1.9 | 0.036 | 0.018 |
| (H)Al—SSZ-70(60%)-HSM | 26.6 | 91.4 | 6.3 | 2.3 | 0.044 | 0.030 |

2-MN: 2-methoxynaphthalene; 1,2-AMN: 1-acetyl-2-methoxynaphthalene; 2,6-AMN: 2-acetyl-6-methoxynaphthalene; 2,8-AMN: 2-acetyl-8-methoxynaphthalene.

The following examples are offered as illustration only, and are not meant to be limiting.

EXAMPLES

Example 1

Synthesis of Conventional Al-SSZ-70 Zeolite with a Si/Al of 50

Conventional microporous zeolite Al-SSZ-70 with a Si/Al=50 was synthesized and used as a seed for the direct hydrothermal synthesis of delaminated zeolite Al-SSZ-70 using the approach detailed below. In a typical synthesis of zeolite seed, 0.0436 g of sodium aluminate ($Na_2O$ $Al_2O_3$ $3H_2O$) was dissolved in a mixture of 2.89 g deionized water and 0.128 g 50 wt. % NaOH aqueous solution. After mixing, 8.70 g of OSDA solution, consisting of 9.7 wt. % of diisobutylimidazolium (DIBI) hydroxide, was added dropwise. Upon obtaining a clear mixture, 1.14 g of silica source (AEROSIL® 200 fumed silica) and 0.06 g of seed (comprising calcined form Al-SSZ-70 zeolite with a Si/Al ratio of 50) was added slowly and stirred manually. After forming a homogeneous mixture, the obtained synthesis gel having a chemical composition of 1.0 $SiO_2$: 0.01 $Al_2O_3$: 0.1 NaOH: 0.2 OSDA: 30 $H_2O$ was obtained. This mixed gel was sealed in an autoclave with a 23 mL Teflon container and heated at 150 °C for 11 days under a rotation rate of 27 RPM. After hydrothermal synthesis, the as-synthesized zeolite powder was recovered through filtration, washed with deionized (DI) water until a measured pH<8.0, and dried at 80 °C overnight. A directly calcined Al-SSZ-70 zeolite product was obtained via calcining the as-synthesized zeolite in air at 580 °C for 5 h to produce a white powder.

Example 2

Synthesis of Delaminated Al-SSZ-70 Zeolite with Varying Amounts of CTAOH Surfactants Delaminated Al-SSZ-70 zeolite was hydrothermally synthesized in the presence of differing amounts of surfactant CTAOH solution. The synthesis procedure is similar to that of Al-SSZ-70 zeolite without surfactant CTAOH as shown above. However, compared with the synthesis above in the absence of CTAOH, part of the OSDA was replaced by CTAOH, while the total molar ratio of organics/$SiO_2$ (organics consist of OSDA and CTAOH) in the synthesis gel was fixed at 0.2. Thus, the relative molar ratio of CTAOH to total content of organics changed from 10 mol % to 90 mol %, while keeping the hydroxide concentration constant. Detailed information about the synthetic chemical composition is summarized in Table 4 below.

In a typical synthesis of delaminated Al-SSZ-70 for samples shown in Table 4, 0.0436 g of sodium aluminate ($Na_2O$ $Al_2O_3$ $3H_2O$) was dissolved into a mixture of 2.8895 g DI water and 0.128 g of 50 wt. % NaOH aqueous solution. After mixing, the necessary amounts of diisobutylimidazolium hydroxide solution (9.7 wt. %) and CTAOH solution (10 wt. %) were added dropwise. Then, 1.14 g of silica source (AEROSIL® 200) and 0.06 g of seed comprising the calcined form of conventional Al-SSZ-70 zeolite seed with a Si/Al of 50 was added and stirred manually. After forming a homogeneous gel, the obtained synthesis gel was sealed in an autoclave with a 23 mL Teflon container and heated at 150 °C for 11 days under a rotation rate of 27 RPM. After synthesis, the as-synthesized zeolite powder was recovered through filtration, washed with DI water until measured pH<8.0, and dried at 80 °C overnight. The obtained dried powder was calcined in air at 580 °C for 5 h to synthesize the calcined form of delaminated Al-SSZ-70(x %) zeolite (x represents the molar ratio of CTAOH in total organics used for synthesis).

TABLE 4

Synthesis conditions for highly delaminated Al—SSZ-70 zeolite with different amounts of CTAOH.

| | Chemical molar compositions | | | | | | CTAOH | Seed |
|---|---|---|---|---|---|---|---|---|
| Sample name | $SiO_2$ | $Al_2O_3$ | NaOH | OSDA | CTAOH | $H_2O$ | (mol. %) | (wt. %) |
| Al—SSZ-70(10%) | 1 | 0.01 | 0.1 | 0.18 | 0.02 | 30 | 10 | 5 |
| Al—SSZ-70(30%) | 1 | 0.01 | 0.1 | 0.14 | 0.06 | 30 | 30 | 5 |
| Al—SSZ-70(50%) | 1 | 0.01 | 0.1 | 0.1 | 0.1 | 30 | 50 | 5 |
| Al—SSZ-70(60%) | 1 | 0.01 | 0.1 | 0.08 | 0.12 | 30 | 60 | 5 |
| Al—SSZ-70(70%) | 1 | 0.01 | 0.1 | 0.06 | 0.14 | 30 | 70 | 5 |
| Al—SSZ-70(80%) | 1 | 0.01 | 0.1 | 0.04 | 0.16 | 30 | 80 | 5 |
| Al—SSZ-70(90%) | 1 | 0.01 | 0.1 | 0.02 | 0.18 | 30 | 90 | 5 |

Example 3

High-Shear Mixing of the as-Synthesized Al-SSZ-70 Zeolites

As an alternative treatment to direct calcination, the as-synthesized materials corresponding to products containing different amounts of CTAOH surfactant (10 mol %, 30 mol %, 50 mol % and 60 mol % CTAOH) were subjected to high-shear mixing treatment. This procedure was conducted to generate greater degrees of delamination while avoiding the need for difficult-to-scale sonication, as has been required in prior syntheses of delaminated zeolites. In a typical treatment, as-synthesized zeolite materials were made into a wet paste for high-shear mixing by mixing approximately 5 mL of water to 0.5 g of as-synthesized material and then centrifuging at 8000 RPM for 5 min. The supernatant was disposed, and the remaining wet paste was high-shear mixed using a dual asymmetric centrifugation mixer (DAC 150.1 FVZ SpeedMixer from Flack Tec, Inc.) according to the following procedure. Typically, 0.75-1.25 g of the wet paste was placed in a 10 g material container with two cylindrical zirconium beads (d=9.5 mm, 1=10 mm). The obtained mixture was subjected to high-shear treatment at 2500 RPM for 2 min, after which 100 μL of deionized water was added. The mixture was subsequently high-shear mixed again under the same conditions. 10 μL of 1 M $NH_4OH$ solution was added to the resulting material, and the resulting slurry was high-shear mixed at 1700 RPM for 1 min. The materials were then dried overnight at 60 °C and calcined in air at 580 °C for 5 h. The resulting samples were denoted as Al-SSZ-70 (x %)-HSM, where x represents the molar ratio of CTAOH in total organics used for synthesis, and HSM stands for high-shear mixing.

Example 4

In-Situ Transmission FTIR Pyridine Desorption

Transmission Fourier-transform infrared (FTIR) spectra of self-supported wafers were recorded using a Nicolet 6700 FTIR spectrometer with a spectral resolution of 2 $cm^{-1}$ and 256 scans. Wafers were loaded into an in-situ flow cell (In-situ Research Instruments, Inc., South Bend, IN), and treated under vacuum at 523 K to dehydrate the sample prior to pyridine uptake. Background spectra were collected under identical conditions in the absence of a wafer at 323K under vacuum. Excess pyridine (20 mL) was injected into a heated gas manifold (423 K) to expose the zeolite wafer in the sample cell at 323K for 1 hour under Ar flow (50 mL/min). Afterwards, desorption of pyridine took place under Ar flow (50 cm3/min) at 323K, 423K, 473K, 523K and 573K, with each temperature maintaining an isotherm for 1 hour. Subsequently, the cell was reintroduced to vacuum and allowed to cool back to 323 K to acquire a spectrum. Integrated intensities of skeleton Si—O—Si overtones in the range 1740-2080 $cm^{-1}$ were used to normalize spectra. Integration of the Lewis and Brøsnsted bands corresponding to v($PyH^+$) at 1544 $cm^{-1}$ and v(PyL) at 1454 $cm^{-1}$ were used to determine the L/B ratios.

Example 5

Catalysis Study

Friedel-Crafts acylation of 2-methoxynapthalene (2-MN) using acetic anhydride as the acylating agent was used as a probe reaction to determine the catalytic activity of synthesized H-type Al-SSZ-70 zeolites. This reaction was chosen as a relevant probe because its activity has been previously demonstrated to be a surrogate for the density of external acid sites on aluminosilicate zeolites. Catalysis was conducted in a Teflon-capped, 48 mL thick-walled glass reactor equipped with a magnetic stirrer and heated under autogenous pressure conditions in an oil bath set to 120 °C for 6 h. 100 mg of H-type Al-SSZ-70 zeolite catalyst was loaded into the reactor together with 0.987 mmol of 2-methoxynapthalene and 1.1 mmol of acetic anhydride (10.% mol excess of acetic anhydride) in 10 mL of 1, 2-dicholoroethane solvent, before introducing the vessel to the oil bath. The reaction was brought to an ice bath upon completion for 8 minutes. 1.1 mmol of internal standard dodecane was added to the final product just before the solution was filtered through a 0.200 m syringe filter for gas chromatographic analysis. The chemicals used in this procedure were used as-received from the manufacturers, and no attempt was made to rigorously exclude atmospheric moisture. These conditions are highly deactivating and lead to extensive coking as visible in the catalyst after reaction, as well as a lack of complete material-balance closure.

Conversion of 2-MN is defined in the following manner:

$$\text{Conversion (\%)} = \frac{\text{Initial} - \text{Final}}{\text{Initial Mol of } 2\text{-}MN} = 1 - \frac{\text{Final mol of } 2\text{-}MN}{\text{Initial Mol of } 2\text{-}MN}$$

Yield of Acylated Products is defined in the following manner:

$$\text{Yield \%} = \frac{\text{mol of Acylated Product formation}}{\text{Initial Mol of } 2\text{-}MN}$$

Selectivity of Acylated Products is defined in the following manner:

$$\text{Selectivity }(\%) = \frac{\text{Mol of Acylated Product}}{\text{Total Liquid Product Mol (excluding } 2\text{-}MN)}$$

Initial rates of reaction and formation are defined in the following manner:

$$I_{2\text{-}MN} = (Conv\ \%) * \frac{\text{Initial } 2\text{-}MN \text{ Mols}}{\text{Reaction Time}}$$

$$F_{1,2\text{-}AMN} = (\text{Yield } \%) * \frac{\text{Initial } 2\text{-}MN \text{ Mols}}{\text{Reaction Time}}$$

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise that as specifically described without actually departing from the spirit and scope of the present invention as defined by the appended claims.

The invention claimed is:

1. A method of preparing a delaminated Al-SSZ-70 zeolite, which comprises:

(a) contacting under crystallization conditions a reaction mixture comprising:
   (1) a source of $Al_2O_3$;
   (2) a source of silica;
   (3) an imidazolium cation (OSDA); and
   (4) a cetyltrimethylammonium cation ($CTA^+$); and
(b) recovering an Al-SSZ-70 zeolite and subjecting the zeolite to high shear mixing;

wherein the mole % of the $CTA^+$ ranges from 10 mol % to 60 mol % of the total organic components (OSDA+$CTA^+$);

wherein the zeolite after high shear mixing is a delaminated Al-SSZ-70 zeolite having a Si/Al ratio of at least 50 and an external surface area of at least 250 $m^2/g$.

2. The method of claim 1, wherein the reaction mixture further comprises (5) an Al-SSZ-70 zeolite seed.

3. The method of claim 2, wherein the Al-SSZ-70 zeolite seed has a Si/Al ratio of at least 50.

4. The method of claim 1, wherein the mol. % of the $CTA^+$ ranges from 10 mol % to 50 mol %.

5. The method of claim 1, wherein the mol. % of the $CTA^+$ ranges from 30 mol % to 60 mol %.

6. The method of claim 1, wherein the mol % of the $CTA^+$ ranges from 50 to 60 mol %.

7. The method of claim 1, wherein the Si/Al molar ratio is in the range of from 50 to 75.

8. The method of claim 1, wherein an Al-SSZ-70 zeolite is recovered and calcined.

9. The method of claim 1, wherein an Al-SSZ-70 zeolite is recovered from the high shear mixing and calcined.

10. The method of claim 1, wherein the high shear mixing comprises a high-shear treatment of at least 1500 RPM for at least 1 minute.

11. The method of claim 10, wherein the high shear mixing comprises a high shear treatment of at least 1500-3000 RPM for a period of time in the range of from 1 minute-30 minutes.

12. The method of claim 1, wherein the high shear mixing comprises a high-shear treatment of at least 2500 RPM for at least 2 minutes, followed by a second high-shear treatment of at least 1700 RPM for at least 1 minute.

13. The method of claim 1, wherein imidazolium cation is selected from the group consisting of 1,3-diisopropylimidazolium cation, a 1,3-diisobutylimidazolium cation, and a 1,3-dicyclohexylimidazolium cation.

14. The method of claim 1, wherein the imidazolium cation is provided in the reaction mixture as a hydroxide.

15. The method of claim 1, wherein the $CTA^+$ cation is provided in the reaction mixture as a hydroxide.

16. The method of claim 3, wherein an Al-SSZ-70 zeolite is recovered and subjected to high shear mixing, and then calcining product recovered from the high shear mixing.

17. The method of claim 1, wherein a Al-SSZ-70 product is recovered, and the Al-SSZ-70 product has an external surface area of at least 300 $m^2/g$.

18. The method of claim 11, wherein a A1-SSZ-70 product is recovered, and the A1-SSZ-70 product has an external surface area of at least 340 $m^2/g$.

* * * * *